April 4, 1939.　　J. B. HUNGATE ET AL　　2,152,888
AUTOMATIC DRAG SCRAPER
Filed Jan. 21, 1938　　2 Sheets-Sheet 1
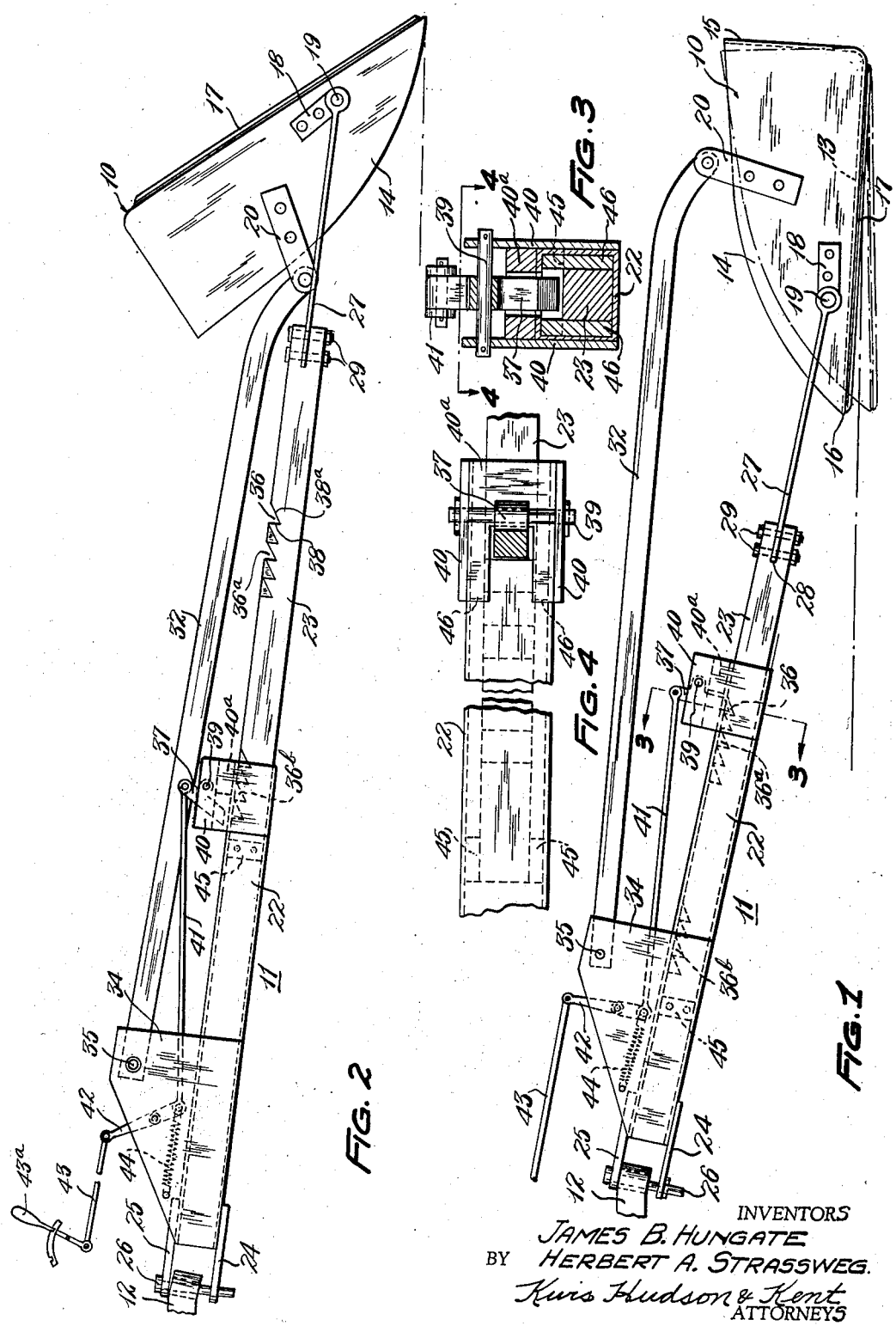
INVENTORS
JAMES B. HUNGATE
BY HERBERT A. STRASSWEG.
Kuis Hudson & Kent
ATTORNEYS April 4, 1939.  J. B. HUNGATE ET AL  2,152,888
AUTOMATIC DRAG SCRAPER
Filed Jan. 21, 1938    2 Sheets-Sheet 2
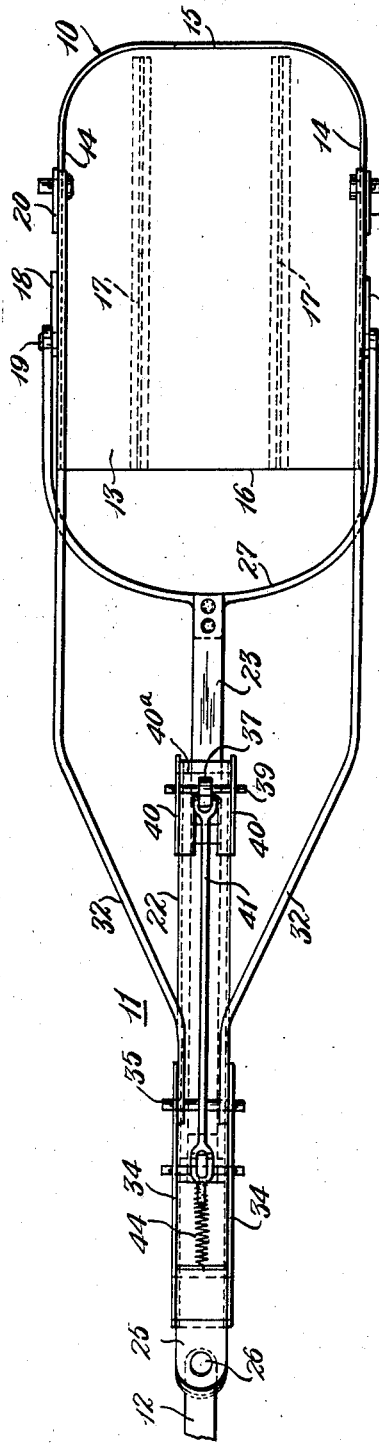
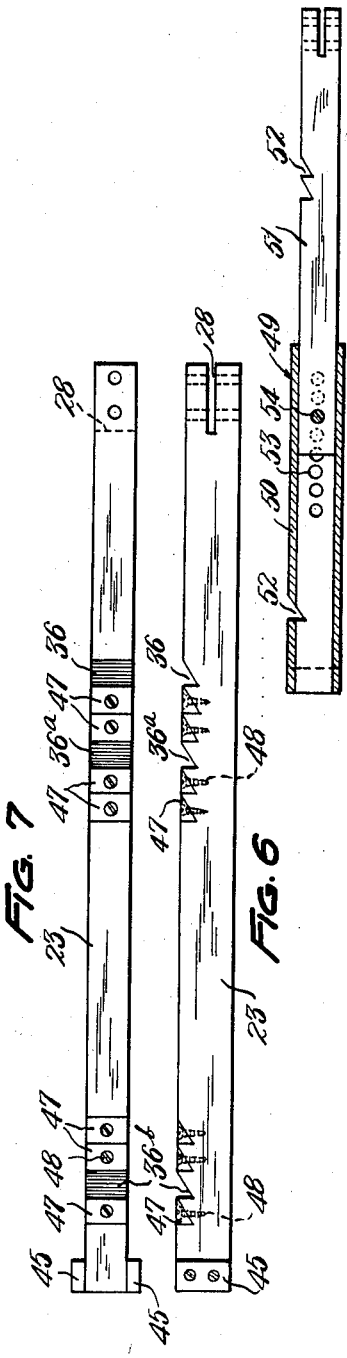
INVENTORS
JAMES B. HUNGATE
HERBERT A. STRASSWEG
BY Kwis Hudson & Kent
ATTORNEYS Patented Apr. 4, 1939

2,152,888

UNITED STATES PATENT OFFICE 2,152,888

AUTOMATIC DRAG SCRAPER

James B. Hungate, Newburgh, and Herbert A. Strassweg, Evansville, Ind.

Application January 21, 1938, Serial No. 186,094

3 Claims. (Cl. 37—138)

This invention relates to scraping apparatus and more particularly to a drag scraper of the type adapted to be used for moving earth or other material from one place to another.

An object of our invention is to provide an improved drag scraper adapted to be operated by a tractor or other power means and having a draft gear embodying novel means whereby the position of the drag scoop can be changed by manipulation of the tractor.

Another object of our invention is to provide improved scraping apparatus, of the type referred to, wherein the draft gear includes a hollow draft beam having a drag bar pivotally connected with the sides of the scoop and movable in the draft beam for changing the position of the scoop, and in which such hollow draft beam, drag bar, and drag bar connecting means are in substantial alignment and provide a substantially straight line pull between the power means and scoop.

Still another object of our invention is to provide improved scraping appartus, of the type referred to, in which the drag bar is longitudinally movable in the draft beam and cooperating locking parts on the beam and drag bar serve to hold the drag bar in different positions of longitudinal adjustment corresponding with different positions for the drag scoop.

A further object of our invention is to provide scraping apparatus, of the type referred to, in which the drag scoop is movable to different positions by relative movement taking place between the hollow draft beam and the drag bar, and by the action of an unloading bar connected with the draft beam and with the scoop at an elevation above the connection of the drag bar with the latter.

Other objects and advantages of the invention will be apparent from the following description when taken in conjunction with the accompanying sheets of drawings in which, Fig. 1 is a side elevation of scraping apparatus embodying our invention.

Fig. 2 is another side elevation of the apparatus, but showing the drag scoop in a different position.

Fig. 3 is a transverse sectional view taken through the draft gear as indicated by line 3—3 of Fig. 1.

Fig. 4 is a partial sectional plan view taken as indicated by line 4—4 of Fig. 3.

Fig. 5 is a plan view of the apparatus.

Fig. 6 is a detached side elevation of the drag bar.

Fig. 7 is a plan view thereof, and

Fig. 8 is a detached elevational view, with parts in section, showing a drag bar of modified form.

More detailed reference will now be made to the accompanying drawings in which we show one embodiment of our improved scraping apparatus, but before proceeding with the detailed description thereof it should be understood that the drawings are to be regarded as being mainly illustrative and that our invention may be embodied in various other forms of scraping apparatus.

In the apparatus here illustrated we show a drag scoop 10, and a draft gear 11 which is adapted to be connected with the hitch 12 of a tractor or other traveling power means for pulling and operating the scoop. The drag scoop may be a bucket-like device of a type well known in the excavating art having a substantially flat bottom 13 and upstanding side and rear walls 14 and 15. At its forward end the scoop is open, as is usual in devices of this kind, and has a leading edge or point 16 which digs into the earth or other material when the scoop is being pulled forward for the purpose of loading the same. If desired, the bottom of the scoop may be provided with one or more longitudinally extending T-bars 17 which are secured to the underside of the bottom with the stem of the T-section pointing downwardly. These bars prevent the scoop from shifting or sliding sideways and also serve to straighten and stiffen the bottom.

Adjacent the forward end of the scoop we provide suitable connecting means which may be in the form of ears 18 riveted to the side walls and carrying laterally projecting pivot pins 19 which form a part of a pivotal connection between the draft gear 11 and the scoop. The side walls 14 may also carry upstanding ears or projections 20 with which the unloading means of the draft gear may be connected, as will be presently explained.

The draft gear 11 comprises an elongated hollow draft beam 22 which may be of rectangular or other desired cross-sectional shape, and a drag bar 23 which is longitudinally movable in the hollow draft beam and projects part way therefrom. The hollow draft beam 22 may be formed of any suitable material, such as connected metal plates or structural bars, and at its forward end may have a pair of forwardly projecting plates or lugs 24 and 25 which form a part of the tractor hitch. These plates may be vertically spaced to receive the part 12 therebetween and may have openings which align with an opening of the latter part and are adapted to receive the pivot pin 26.

The drag bar 23 may be formed of metal or other suitable material and is of a cross-sectional shape similar to that of the draft beam 22 so as to be longitudinally slidable in the latter. The rear or projecting end of the drag bar 23 is connected with the scoop adjacent its forward end and, for this purpose, any suitable connecting means may be employed. In this instance, we show a bail-like member 27 of the type commonly employed for pulling drag scoops and we show this member as having a squared portion at its forward end which is received in a slot 28 of the drag bar and more or less rigidly connected therewith by the bolts 29. The rearwardly extending laterally spaced arms of the bail 27 carry eyes which receive the pins 19 and form pivotal connections with the sides 14 of the scoop.

We desire at this time to call attention to an important feature of our draft gear, as thus far described, which provides for a substantially straight line pull between the power device and the scoop. As will be seen from Fig. 1 of the drawings, the hollow draft beam 22, the drag bar 23 and the bail 27 are all in substantial alignment with each other and provide a substantially straight line pull between the hitch member 12 and the pivot pins 19. This straight line pull provides for very efficient operation of the scraper with minimum expenditure of power on the part of the tractor or traveling power device used to pull the apparatus.

In the operation of drag scoop apparatus it is desirable to be able to change the position of the drag scoop at different times to cause loading, riding or unloading thereof. The loading and riding positions of the scoop 10 are shown in Fig. 1, the loading position being shown in broken lines and the riding position being shown in full lines. In Fig. 2 we show the scoop in an unloading position which will cause the material to be dumped at a desired point. In some instances it is desirable to be able to move the scoop to another unloading position in which the bottom of the scoop is substantially vertical and which causes a spreading of the load over a given area while being discharged from the scoop.

For moving the scoop from one of these positions to the other, we provide the draft gear 11 with novel means, whereby the power and movement of the tractor may be utilized to cause the shifting and thus make it unnecessary for a man to walk behind the scoop and operate the same by means of handles or the like. The novel means for shifting the position of the scoop consists, in part, of the slidable connection between the draft beam 22 and the drag bar 23 and, in part, in the provision of one or more unloading bars 32. As best seen in Figs. 1 and 5, the unloading bars 32 may have their rear ends pivotally connected with the ears 20 of the scoop and their forward ends connected with the draft beam 22. The forward ends of the unloading bars 32 may be connected with the draft beam 22 by providing the latter with a pair of upstanding laterally spaced plates 34 and a pivot pin 35 which extends through openings of the unloading bars and the plates.

To provide for locking the drag bar 23 with the draft beam 22, as is desirable at certain times during the operation of the apparatus, we provide releasable locking means comprising longitudinally spaced recesses 36, 36a and 36b in the drag bar and a pivoted latch 37 on the draft beam. The recesses are preferably in the form of notches cut or formed in the top of the drag bar so that each recess provides an abutment or shoulder 38 and a sloping bottom wall 38a. The latch 37 may be mounted on a pivot pin 39 which extends through a pair of upstanding laterally spaced plate members 40 of the draft beam. The lower end of the latch 37 projects into the hollow draft beam 22 through an opening in the top thereof and is shaped to engage in the recesses. To enable the latch to hold the drag bar 23 against rearward movement without causing shearing or bending of its pivot pin 39, we may provide a back-up block 40a for the latch. This block may be mounted on the hollow draft beam and between the plates 40.

The outer end of the latch 37 is pivotally connected with an actuating link 41 which extends forward and is connected with the lower end of a lever 42 which is pivotally mounted on the plate members 34. A second link 43 may be connected with the lever 42 to extend forwardly to a lever 43a, or equivalent actuating member, adjacent the driver's seat of the tractor so that, by manipulation of such lever, the driver can cause lifting of the latch 37 from the drag bar recess in which it may be engaged. A tension spring 44 may be connected with the lever 42 so as to normally exert a pull on the link 41 tending to cause the latch 37 to engage in one of the recesses.

It will be noted that the three recesses 36, 36a and 36b of the drag bar 23 are arranged on the bar as two longitudinally spaced sets, the recesses 36 and 36a constituting the rear set and the recess 36b constituting the forward set. When the recess 36 is in use, that is, when the latch 37 engages therein, the drag scoop 10 is in its riding or loaded position, as shown in full lines in Fig. 1. When the latch 37 engages in the recess 36a the drag scoop is in its loading or digging position, with its leading edge 16 lowered or depressed, as indicated by the broken line position of the scoop shown in Fig. 1. When the latch 37 engages in the recess 36b the scoop is held in an unloading position, that is, with its bottom extending substantially vertical to cause spreading of the material while it is being discharged.

To prevent the drag bar 23 from being fully withdrawn from the draft beam 22, we provide retaining means which may comprise lugs 45 on opposite sides of the drag bar adjacent its forward end and stop plates 46 secured in the draft beam adjacent its rear end. The drag bar is inserted into the draft beam from its forward end and thereafter the lugs 45 and the plates 46 cooperate in preventing the drag bar from being pulled out of the draft beam.

In the operation of our improved scraping apparatus the driver of the tractor drives to the point at which earth is to be loaded into the scoop and at that point operates his lever to cause lifting of the latch 37 out of the recess 36, whereupon the forward movement of the tractor and draft beam causes the drag bar 23 to move relatively rearwardly in the draft beam a distance corresponding with the spacing of the recesses 36 and 36a. This relative rearward movement of the drag bear 23 causes the point of the scoop to be lowered to its loading position. The driver permits the latch 37 to engage in the recess 36a so as to hold the scoop in its loading position and enable the same to be pulled forward by the tractor to pick up a load of earth. After the scoop has been filled, the operator reverses the tractor and the backward movement causes the hollow draft beam 22 to slide rearwardly on the drag bar 23 while it and the scoop remain substantially stationary. The rearward movement of the draft beam on the drag bar shifts the latch 37 from the recess 36a into the recess 36, thereby lifting the point of the scoop to an elevation corresponding with the riding position of the scoop. The driver then drives the tractor forward, pulling the loaded scoop to the place where it is to be unloaded.

When the unloading station is reached, the driver operates his lever 43a to disengage the latch 37 from the recess 36 and holds the latch elevated while the tractor is driven forward. This forward movement of the tractor causes a pull to be applied to the upper part of the scraper through the unloading bars 32 while the drag bar 23 slides relatively freely in the draft beam 22. This causes the point 16 of the scoop to dig into the ground and results in the scoop being tipped upwardly by the bars 32 to its unloading or dumping position. If the driver desires to dump the entire load of the scoop at one point he retains the latch 37 elevated and permits the drag bar 23 to travel to its extreme extended position shown in Fig. 2, but if the load is to be spread over a given area, he permits the latch to engage in the recess 36b which causes the scraper to be held in a substantially vertical position and results in the load being spread over the desired area while the tractor travels forward. After the unloading operation, the driver reverses the tractor and the backward movement of the draft beam 22 causes the scraper to be restored to its riding position with the latch 37 engaging in the recess 36, whereupon the driver may proceed again to the loading point.

For various reasons, it may be desirable to vary the spacing or position of the recesses of the drag bar and thus vary the different operating positions of the drag scoop. This result may be obtained by substituting a drag bar having differently spaced recesses, but to avoid the need of having a plurality of different drag bars we prefer to employ a novel form of construction for the drag bar 23. As best seen in Figs. 6 and 7, this drag bar has two sets of recesses formed therein, the forward set of which includes the recess 36b and the rear set of which includes the recesses 36 and 36a. To provide for the desired adjustment, we form the drag bar with a plurality of recesses in each set, for example, four recesses in the forward set and six recesses in the rear set. The particular recesses of these sets which provide the desired scoop positions are selected and the remaining recesses are closed by means of correspondingly shaped plugs 47, which may be held in place by means of appropriate screws 48 or the like. The positions for the drag scoop may be varied as desired by shifting of the plugs 47 from one recess to another, so as to provide the desired combination of recesses.

Another form of drag bar can be used if desired to secure variation in the spacing of the sets of recesses. This latter drag bar 49 is shown in Fig. 8 and comprises telescoping sections 50 and 51, each of which carries a set of the recesses 52 which determine the different positions of the scoop. The telescoping sections 50 and 51 are provided with rows of transverse openings 53 of which certain openings are adapted to be brought into alignment and through which a locking pin 54 may be passed when the desired relative adjustment between the sets of recesses has been obtained.

From the foregoing description and the accompanying drawings it will now be readily seen that we have provided improved drag scoop apparatus in which novel draft gear of simple and efficient form provides for a substantially straight line pull between the power device and the scoop, and in which novel scoop operating means makes it possible for the driver of the tractor to utilize the power and movement thereof to shift the scoop from one position to another for purposes of loading and unloading, thereby eliminating the need for a man to walk behind the scoop to operate the same.

While we have illustrated and described our improved scraping apparatus in a somewhat detailed manner, it will be understood, of course, that we do not wish to be limited to the precise construction and arrangement herein disclosed, but regard our invention as including such changes and modifications as do not constitute a departure from the spirit of the invention and the scope of the appended claims.

Having thus described our invention, we claim:

1. A drag scraper comprising a scoop, an elongated hollow draft beam having means at its forward end for connection with a tractor or the like, a drag bar slidable in said hollow beam and having means at its rear end pivotally connected with the sides of the scoop, said drag bar having longitudinally spaced recesses providing locking shoulders thereon corresponding with different positions for the scoop, a latch on said draft beam adapted for engagement with said locking shoulders, and plugs in certain of said recesses to prevent engagement of the latch therein.

2. A drag scraper comprising a scoop, an elongated hollow draft beam having means at its forward end for connection with a tractor or the like, a drag bar slidable in said hollow beam and having means at its rear end pivotally connected with the sides of the scoop, said drag bar comprising telescoping sections each having one or more recesses providing locking shoulders, and a latch on said draft beam adapted for engagement with said shoulders, the sections of said drag bar being adjustable for varying the spacing of said shoulder.

3. In apparatus of the character described, a drag scoop, an elongated draft beam having means at its forward end for connection with a traveling power device, said beam being hollow and of substantially square cross-section and having pairs of spaced upstanding plates connected therewith and providing brackets thereon adjacent its opposite ends, a drag bar of corresponding substantially square cross-section slidable in said hollow beam and having means at its rear end pivotally connected with the sides of the scoop, an unloading bar having one end pivotally connected with the scoop at an elevation above the connection of the drag bar therewith and its other end disposed between and pivotally connected with the forward pair of bracket plates of the draft beam, said drag bar having adjacent its forward end a shoulder and a recess and at a rearward point having a pair of longitudinally spaced recesses, a stop on the draft beam adapted to be engaged by the shoulder of the drag bar when the latter is extended and the scoop is in dumping position, a latch pivotally mounted between the rearward pair of bracket plates of the draft beam and engageable with said spaced recesses for holding the scoop in riding and loading positions and engageable with the forward recess for holding the scoop in a spreading position, said recesses and latch being shaped to cause disengagement of the latch by backward movement of the power device and draft beam, and means manually operable to cause disengagement of said latch.

JAMES B. HUNGATE.
HERBERT A. STRASSWEG.